US012766869B2

(12) United States Patent
Kim et al.

(10) Patent No.: US 12,766,869 B2
(45) Date of Patent: Oct. 20, 2026

(54) CORROSION PLATE AND METHOD OF MANUFACTURING WINDOW USING THE SAME

(71) Applicant: Samsung Display Co., Ltd., Yongin-Si (KR)

(72) Inventors: Jun Young Kim, Yongin-si (KR); Hyun Chul Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 18/954,573

(22) Filed: Nov. 21, 2024

(65) Prior Publication Data

US 2025/0332856 A1 Oct. 30, 2025

(30) Foreign Application Priority Data

Apr. 24, 2024 (KR) ........................ 10-2024-0054388

(51) Int. Cl.

*B41N 1/06* (2006.01)
*B41M 1/34* (2006.01)
*B41M 3/00* (2006.01)
*B41N 1/12* (2006.01)
*B41F 17/00* (2006.01)

(52) U.S. Cl.

CPC ............... *B41N 1/06* (2013.01); *B41M 3/008* (2013.01); *B41N 1/12* (2013.01); *B41F 17/001* (2013.01); *B41M 1/34* (2013.01)

(58) Field of Classification Search

None
See application file for complete search history.

(56) References Cited

FOREIGN PATENT DOCUMENTS

| | | | | |
|---|---|---|---|---|
| EP | 1148954 B1 * | 7/2003 | ............. | B05C 1/022 |
| KR | 10-0952897 B1 | 4/2010 | | |
| KR | 10-1189752 B1 | 10/2012 | | |

* cited by examiner

*Primary Examiner* — Joshua D Zimmerman
(74) *Attorney, Agent, or Firm* — Innovation Counsel LLP

(57) ABSTRACT

A corrosion plate extending in a longitudinal direction and having a groove corresponding to a printed pattern to be disposed on a base substrate includes an intaglio pattern having end portions and a central portion between the end portions. At least one of the end portions has a different cross-sectional area from the central portion, and each of the cross-sectional areas is on a plane perpendicular to a longitudinal direction.

13 Claims, 16 Drawing Sheets

CORROSION PLATE AND METHOD OF MANUFACTURING WINDOW USING THE SAME

CROSS-REFERENCE TO RELATED APPLICATION

The application claims priority to and the benefit of Korean Patent Application No. 10-2024-0054388 filed on Apr. 24, 2024, which is hereby incorporated by reference for all purposes as if fully set forth herein.

BACKGROUND

Field

The present disclosure relates to a method of manufacturing a window. Specifically, the present disclosure relates to a corrosion plate and a method of manufacturing a window using the same.

DISCUSSION

In order to protect a display module from external shock, a display device includes a window attached on the display module. The window that forms an external surface of the display device also directly affects the design of a device.

Accordingly, a printed pattern may be formed on the window not only to protect the display module but also to add various designs to the display device. For example, the printed pattern may be formed on the window by transferring ink to a base substrate using a pad and a corrosion plate.

SUMMARY

The present disclosure provides a corrosion plate for manufacturing a large window with high reliability.

The present disclosure provides a method of manufacturing a window using the corrosion plate.

The present disclosure are not limited to the embodiments mentioned herein.

A corrosion plate extends in a longitudinal direction and has a groove corresponding to a printed pattern to be disposed on a base substrate according to embodiments of the present disclosure. The corrosion plate may include an intaglio pattern having end portions and a central portion between the end portions, wherein at least one of the end portions has a different cross-sectional area from the central portion, and the cross-sectional area is perpendicular to the longitudinal direction.

In an embodiment, a cross-sectional area at the end portion may be smaller than a cross-sectional area at the central portion.

In an embodiment, a depth at the end portion may be smaller than a depth at the central portion.

In an embodiment, the end portion may have a surface that is inclined relative to a surface of the central portion.

In an embodiment, the central portion may have a constant depth in the longitudinal direction, and the end portion may have a depth that decreases with distance from the central portion in the longitudinal direction.

In an embodiment, a width at the end portion may be smaller than a width at the central portion.

In an embodiment, the central portion may have a constant width in the longitudinal direction, and the end portion may have a width that decreases with distance from the central portion in the longitudinal direction.

A method of manufacturing a window according to embodiments of the present disclosure may include printing a first printed pattern on a base substrate using a corrosion plate including an intaglio pattern having end portions and a central portion between the end portions, wherein at least one end portion has a different cross-sectional area from the central portion, each cross-sectional area being on a plane that is perpendicular to a longitudinal direction; and printing a second printed pattern on the base substrate using the corrosion plate. A portion of the first printed pattern and a portion of the second printed pattern may overlap each other, and the first printed pattern and the second printed pattern on the base substrate form the window.

In an embodiment, a portion corresponding to the end portion of the corrosion plate in the first printed pattern and a portion corresponding to the end portion of the corrosion plate in the second printed pattern may be printed to overlap each other at least partially.

In an embodiment, the printing of the first printed pattern may include depositing printing ink in the corrosion plate; transferring the printing ink from the corrosion plate to the pad; and printing the first printed pattern on the base substrate by pressing the pad with the printing ink against the base substrate.

In an embodiment, the first printed pattern may be formed by transferring the printing ink from the intaglio pattern to the base substrate, the first printed pattern having first sub-areas and a first central area between the first sub-areas, a cross-sectional area of at least one of the first sub-areas corresponding to the end portions of the intaglio pattern may be smaller than a cross-sectional area of the central area corresponding to the central portion of the intaglio pattern.

In an embodiment, the cross-sectional area in the first sub-area may decrease with distance from the first central area in the longitudinal direction.

In an embodiment, a thickness in the first sub-area may be smaller than a thickness in the first central area.

In an embodiment, a width in the first sub-area may be smaller than a width in the first central area.

In an embodiment, the printing the second printed pattern may include depositing the printing ink into a groove in the corrosion plate; transferring the printing ink from the corrosion plate to the pad; and printing the second printed pattern on the base substrate such that the second printed pattern partially overlaps the first printed pattern by pressing the pad with the printing ink against the base substrate.

In an embodiment, the second printed pattern may be formed by transferring the printing ink from the intaglio pattern to the base substrate, the second printed pattern having second sub-areas and a second central area between the second sub-areas, wherein a cross-sectional area of at least one of the second sub-areas corresponding to the end portions of the intaglio pattern may be smaller than a cross-sectional area of the a second central area corresponding to the central portion of the intaglio pattern.

In an embodiment, the first sub-area of the first printed pattern and the second sub-area of the second printed pattern may overlap each other at least partially.

In an embodiment, the cross-sectional area in the second sub-area may decrease with distance from the second central area in the longitudinal direction.

In an embodiment, a thickness in the second sub-area may be smaller than a thickness in the second central area.

In an embodiment, a width in the second sub-area may be smaller than a width in the second central area.

Specific details of other embodiments are included in the detailed description and drawings.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
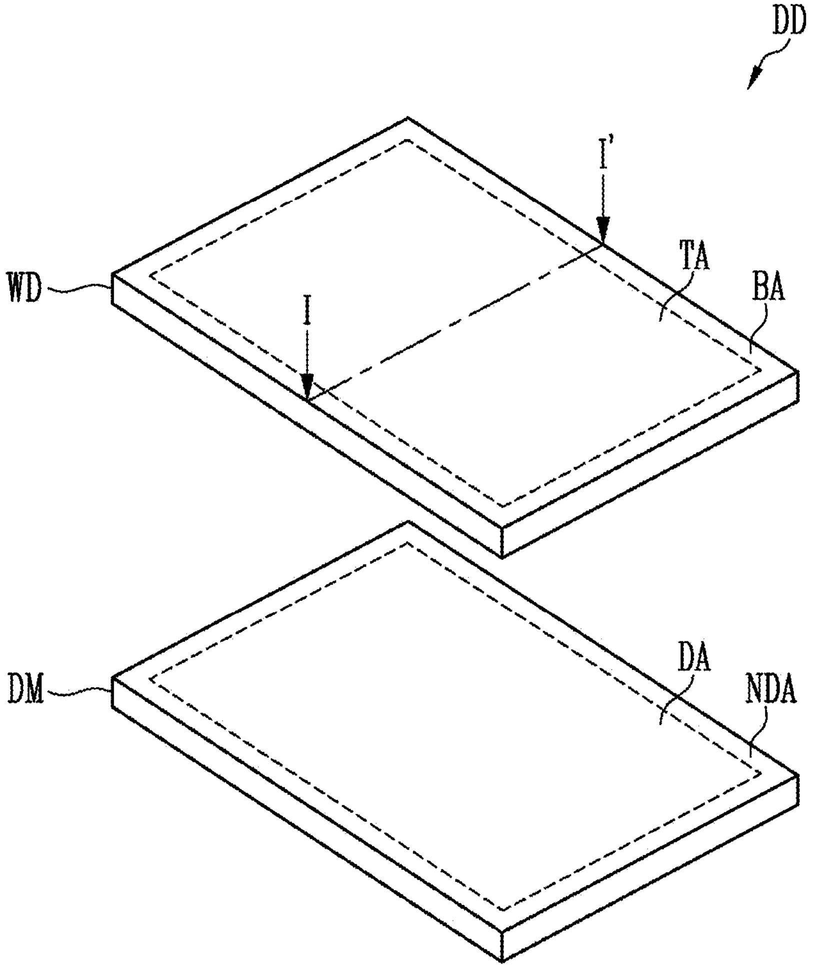
FIG. 1 is a diagram for explaining a display device according to an embodiment of the present disclosure.

As the inventive concept of present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

In describing each drawing, similar reference numerals are used for similar components. In the attached drawings, the dimensions of the structures are enlarged from the actual dimensions to clarify the present disclosure. It will be understood that, although the terms "first", "second", etc. may be used herein to describe various elements, these elements should not be limited to any order or priority by these terms. These terms are only used to distinguish one element from another element. For instance, a first element discussed below could be termed a second element without departing from the scope of the present disclosure. Similarly, the second element could also be termed the first element.

It will be further understood that the terms "comprise", "include", "have", etc. used in the disclosure, specify the presence of stated features, integers, steps, operations, elements, components, and/or combinations of them but do not preclude the presence or addition of one or more other features, integers, steps, operations, elements, components, and/or combinations thereof. In addition, when a first part such as a layer, film, region, plat, etc. is on a second part, the first part may be not only "directly on" the second part but a third part may intervene between them. Furthermore, in the disclosure, when a first part such as a layer, film, region, plat, etc. is formed on a second part, a direction in which the first part is formed is not limited to an upper direction of the second part, but may include a side or a lower direction of the second part. In contrast, when a first part such as a layer, film, region, plat, etc. is "under" a second part, the first part may be not only "directly under" the second part but a third part may intervene between them.

Hereinafter, preferred embodiments of the present disclosure and other matters necessary for those skilled in the art to easily understand the contents of the present disclosure will be described in detail with reference to the attached drawings. In the description below, the singular expressions are intended to include the plural expressions as well, unless the context clearly indicates otherwise.

FIG. 1 is a diagram for explaining a display device according to an embodiment of the present disclosure.

Referring to FIG. 1, a display device DD may include a window WD and a display module DM.

The display device DD may be used as a display screen for portable electronic devices such as a mobile phone, a smart phone, a tablet personal computer (PC), a mobile communication terminal, an electronic notebook, an e-book, a portable multimedia player (PMP), a navigation, and an ultra mobile PC (UMPC). In addition, the display device DD may be used as a display screen for various products such as television, a laptop, a monitor, a billboard, and the Internet of Things (IOT).

The display module DM may display an image through a front surface. The display module DM may be a light emitting type display panel. For example, the display module DM may be an organic light emitting display panel, a quantum dot light emitting display panel, a micro LED display panel, or a nano LED display panel.

The display module DM may include a display area DA and a non-display area NDA.

The display area DA may be an area where an image is displayed. Pixels for displaying an image may be arranged in the display area DA.

The non-display area NDA may be an area where an image is not displayed. The non-display area NDA may define the shape of the display area DA. The non-display area NDA may be adjacent to the display area DA and may surround the display area DA. At least one pad, wiring, and the like for driving the pixels may be disposed in the non-display area NDA.

The window WD may form the appearance of the display device DD. The window WD may be disposed on the front surface of the display module DM to protect the display module DM. The image displayed on the display module DM may transmit through the window WD and be visually recognized by a user.

The window WD may be attached to the display module DM using an adhesive layer. For example, the adhesive layer may include an adhesive member such as an optical clear adhesive (OCA) or a pressure sensitive adhesive (PSA).

The window WD may include an optically transparent insulating material. For example, the window WD may include glass or plastic. The window WD may be formed as a multi-layer structure or a single-layer structure.

The window WD may include a transmission area TA and a bezel area BA.

The transmission area TA may be an area that transmits incident light. The transmission area TA may have a shape corresponding to the display area DA of the display module DM. For example, the transmission area TA may overlap the entire surface or at least part of the display area DA of the display module DM. The image displayed in the display area DA of the display module DM may be visually recognized from the outside through the transmission area TA.

The bezel area BA may be an area with relatively low light transmittance compared to the transmission area TA. The bezel area BA may define the shape of the transmission area TA. The bezel area BA may be adjacent to the transmission area TA and may surround the transmission area TA.

The bezel area BA may have a predetermined color by a printed pattern (for example, the printed pattern PP in FIG. 13) described later. The bezel area BA may have a shape corresponding to the non-display area NDA of the display module DM. For example, the bezel area BA may overlap the entire surface or at least part of the non-display area NDA of the display module DM. The bezel area BA may cover the non-display area NDA of the display module DM to block the non-display area NDA from being visually recognized from the outside.

Figure 2:
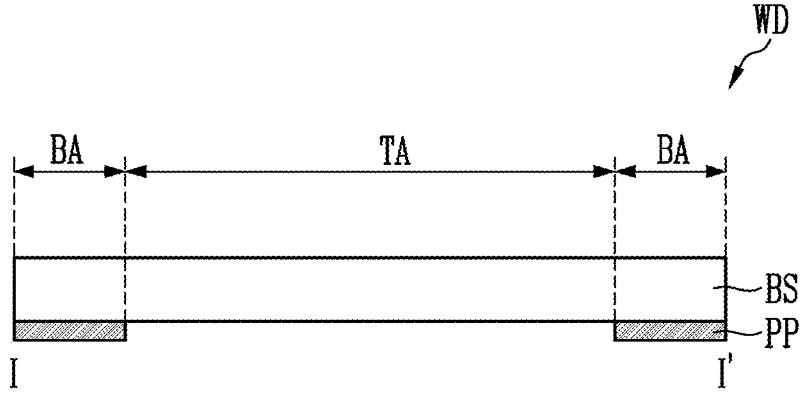
FIG. 2 is a cross-sectional view of a window taken along line I-I' of FIG. 1.

FIG. 2 is a cross-sectional view of the window WD. More specifically, FIG. 2 is a cross-sectional view illustrating the window WD taken along line I-I' of FIG. 1.

Referring to FIG. 2, the window WD may include a base substrate BS and a printed pattern PP.

The base substrate BS may be made of an optically transparent insulating material. For example, the base substrate BS may be provided as a glass substrate or a plastic substrate. When the base substrate BS is a plastic substrate, the base substrate BS may include a polymer material. For example, the base substrate BS may be made of polyimide (PI), polyacrylate (PA), polymethylmethacrylate (PMMA), polycarbonate (PC), polyethylene naphthalate (PEN), polyvinylidene chloride (PVC), polyvinylidene difluoride (PVDF), polystyrene (PS), ethylene-vinyl alcohol copolymer, or a combination thereof.

As shown in FIG. 1, the center portion and edge portion of the base substrate BS may be flat. However, the present disclosure is not limited to the above-described examples, and the center portion of the base substrate BS may be flat and the edge portion may be curved.

The printed pattern PP may be disposed on the base substrate BS corresponding to the bezel area BA. The printed pattern PP may overlap the bezel area BA. The printed pattern PP may be composed of an organic light-blocking material or an inorganic light-blocking material including black pigment or black dye. For example, the printed pattern PP may include carbon black, or the like. However, the present disclosure is not limited to the above-described examples, and the printed pattern PP may be composed of an organic light-blocking material or an inorganic light-blocking material including colored pigments or colored dyes. The color of the printed pattern PP may be defined as the color of the bezel area BA.

FIGS. 3 to 6 are diagrams for explaining a corrosion plate according to an embodiment of the present disclosure.

Figure 3:
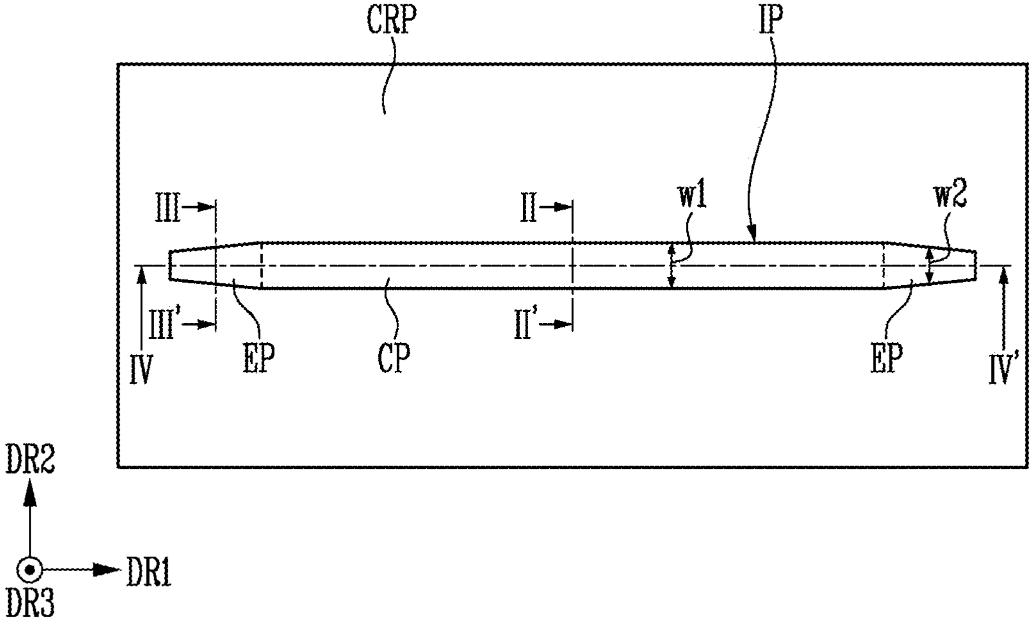
FIGS. 3 to 6 are diagrams for explaining a corrosion plate according to an embodiment of the present disclosure.
Figure 4:
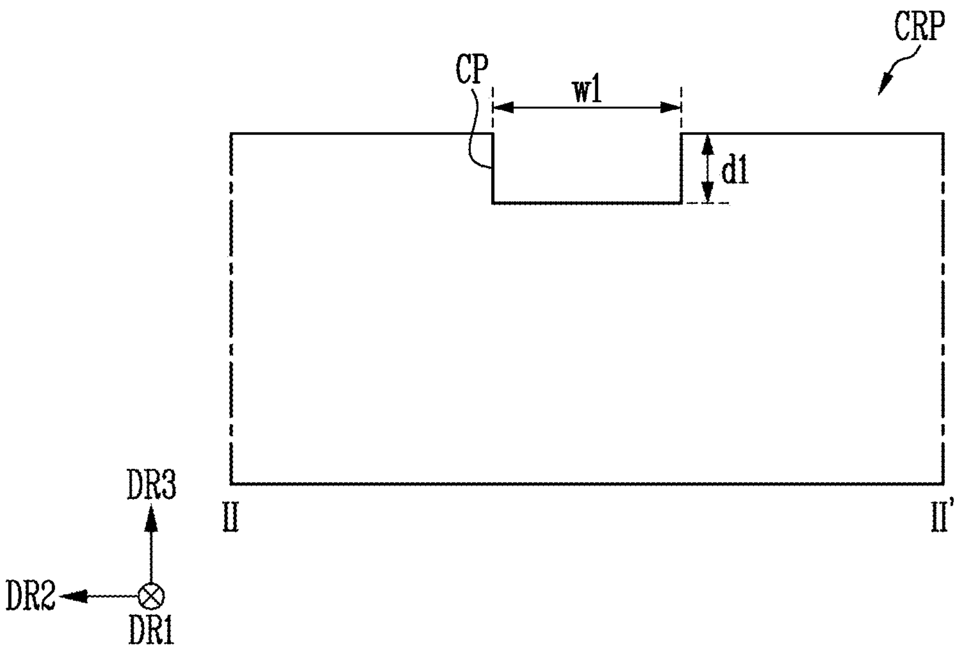
Figure 5:
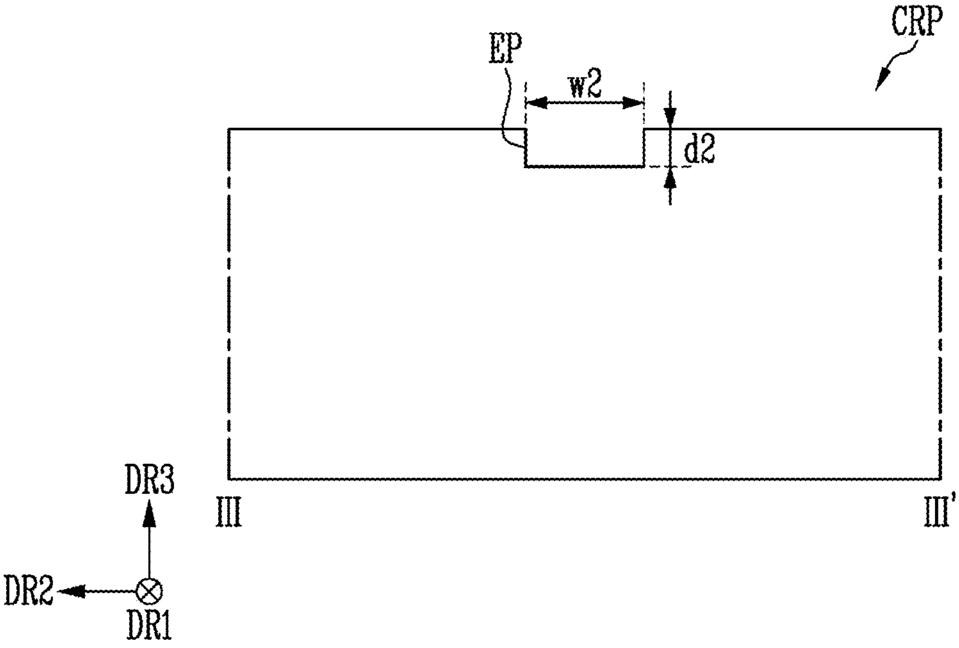
Figure 6:
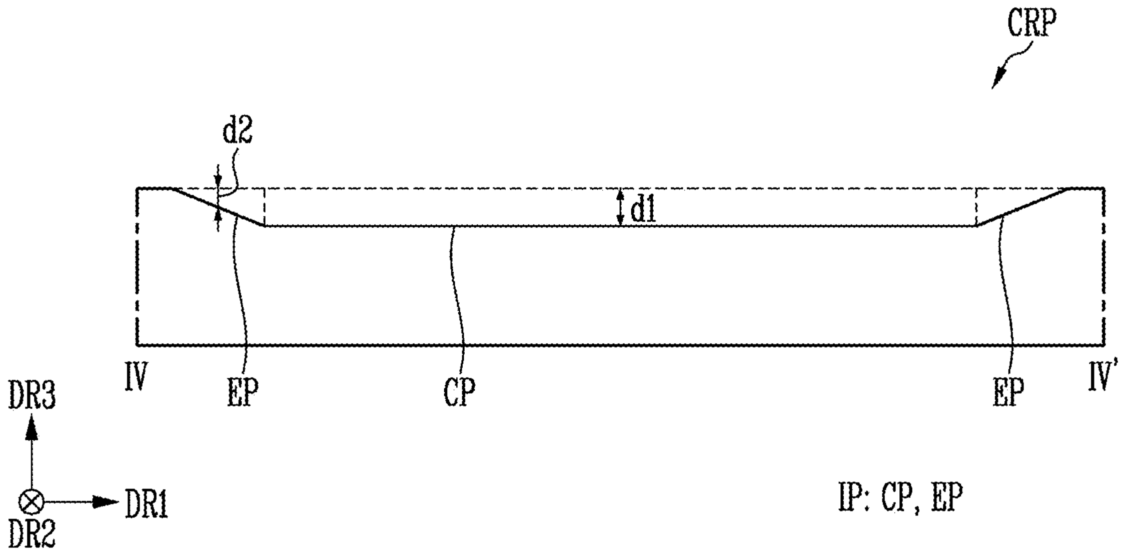

FIG. 3 is a plan view illustrating a corrosion plate according to an embodiment of the present disclosure. FIG. 4 is a cross-sectional view taken along line II-II' of FIG. 3. FIG. 5 is a cross-sectional view taken along line III-III' of FIG. 3. FIG. 6 is a cross-sectional view taken along line IV-IV' of FIG. 3.

Referring to FIG. 3, in a process of manufacturing the window WD, a corrosion plate CRP may be used to print the printed pattern PP.

The corrosion plate CRP may include a groove or an intaglio pattern IP corresponding to the shape of the printed pattern PP that will be printed on the base substrate BS of FIG. 2. A printed pattern (for example, the first printed pattern PP1 of FIG. 13) may be printed by depositing printing ink (for example, the printing ink INK of FIG. 9) into the groove or the intaglio pattern IP of the corrosion plate CRP. Thereafter, a pad (for example, the pad PD of FIG. 10) may be pressed to the corrosion plate CRP to transfer the printing ink from the corrosion plate, and the pad may be pressed to the base substrate BS to print the printed pattern PP on the base substrate BS. The window WD may be formed by printing the printed pattern PP on the base substrate BS.

An upper surface of the corrosion plate CRP may be positioned on a plane defined by a first direction DR1 and a second direction DR2 intersecting the first direction DR1, and the intaglio pattern IP may be a pattern formed by carving the surface of the corrosion plate CRP in a third direction DR3 perpendicular to the first direction DR1 and the second direction DR2.

In addition, since the intaglio pattern IP extends in the first direction DR1, the first direction DR1 may be referred to as a "longitudinal direction" of the intaglio pattern IP. A cross-sectional area of the intaglio pattern IP may mean an area on a plane perpendicular to the first direction DR1.

In an embodiment, the corrosion plate CRP may include the intaglio pattern IP.

The intaglio pattern IP may include two end portions EP and a central portion CP located between the two end portions EP. The intaglio pattern IP may have different cross-sectional areas. For example, at least one of the end portions EP may have a different cross-section area from and the central portion CP.

The central portion CP of the intaglio pattern IP may extend in the first direction DR1 and have a width w1 defined in the second direction DR2 and a depth d1 defined in the third direction DR3. The end portion EP of the intaglio pattern IP may also extend in the first direction DR1 and have a width w2 defined in the second direction DR2 and a depth d2 defined in the third direction DR3.

Referring to FIGS. 3 to 5, a cross-sectional area of the intaglio pattern IP at the end portion EP may be different from a cross-sectional area of the intaglio pattern IP at the central portion CP.

Specifically, the cross-sectional area of the intaglio pattern IP at the end portion EP may be smaller than the cross-sectional area of the intaglio pattern IP at the central portion CP. The intaglio pattern IP may have a constant cross-sectional area (e.g., w1×d1) throughout the central portion CP extending in the first direction DR1. However, in the end portion EP, the intaglio pattern IP may have a cross-sectional area that decreases with distance from the central portion CP in the first direction DR1. That is, in the intaglio pattern IP, the boundary between the central portion CP and the end portion EP may be where the cross-sectional area of the intaglio pattern IP begins to change.

In an embodiment, the width w2 of the intaglio pattern IP at the end portion EP may be smaller than the width w1 of the intaglio pattern IP at the central portion CP. In the central portion CP, the intaglio pattern IP may have a constant width w1 in the first direction DR1. In the end portion EP, the intaglio pattern IP may have the width w2 that decreases with distance from the central portion CP in the first direction DR1. That is, the central portion CP may have a rectangular shape on a plane (e.g., as shown in FIG. 3), and the end portion EP may have a trapezoidal shape whose width decreases with distance from the central portion CP in the first direction DR1. Preferably, the end portion EP may have an isosceles trapezoidal shape on a plane. However, embodiments according to the present disclosure are not limited thereto.

Referring to FIGS. 3 to 6, the depth d2 of the intaglio pattern IP at the end portion EP may be smaller than the depth d1 of the intaglio pattern IP at the central portion CP. In the central portion CP, the intaglio pattern IP may have a constant depth d1 in the first direction DR1. In the end portion EP, the intaglio pattern IP may have the depth d2 that decreases as the distance from the central portion CP in the first direction DR1 increases. That is, at least one surface of the end portion EP may be inclined at a predetermined angle relative to on the bottom surface in the central portion CP. The central portion CP may have a rectangular shape in a cross section taken along a plane defined by the first direction DR1 and the third direction DR3. The end portion EP may have a triangular or trapezoidal shape (see FIG. 5 and FIG. 7 below) whose depth decreases in the first direction DR1 in the cross section.

Since the intaglio pattern IP has different cross-sectional areas at the end portion EP and the central portion CP, the printed pattern PP can be printed in the shape of the intaglio pattern IP. Therefore, a cross-sectional area of the printed pattern PP corresponding to the end portion EP of the intaglio pattern IP may be smaller than a cross-sectional area of the printed pattern PP corresponding to the central portion CP of the intaglio pattern IP. Therefore, even if adjacent printed patterns PP partially overlap each other, the height difference or dimensional distortion in the printed patterns PP can be minimized.

Figure 7:
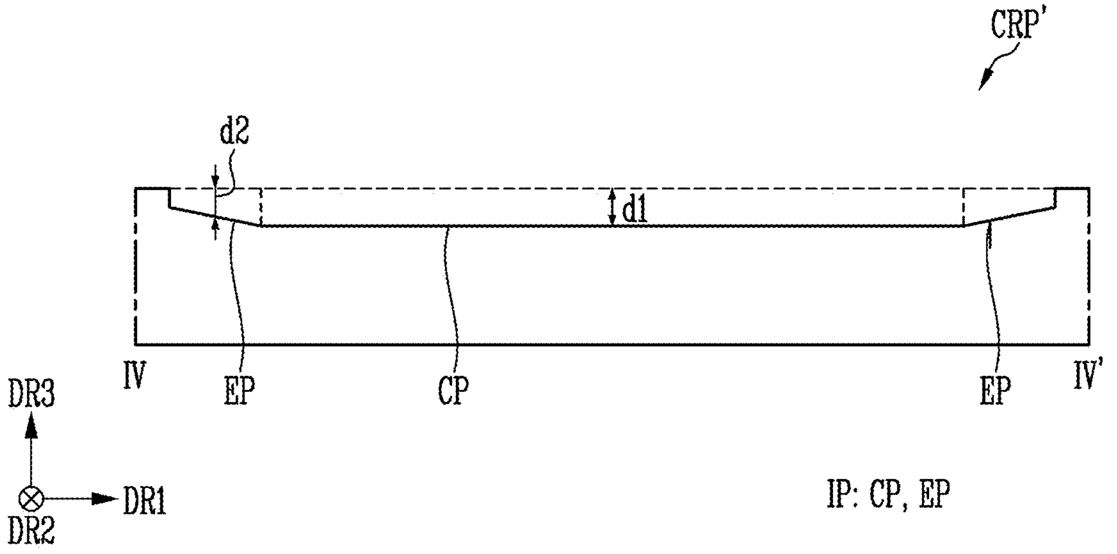
FIG. 7 is a cross-sectional view illustrating a corrosion plate according to another embodiment of the present disclosure.

FIG. 7 is a cross-sectional view illustrating a corrosion plate according to another embodiment of the present disclosure.

An intaglio pattern IP of a corrosion plate CRP' according to the present embodiment may be substantially the same as the intaglio pattern IP of the corrosion plate CRP described above, except for the cross-sectional shape of the intaglio pattern IP at the end portion EP. Therefore, any description that may overlap with the above-described content will be explained in an abbreviated manner or omitted.

Referring to FIG. 7, the corrosion plate CRP' may include the intaglio pattern IP.

A depth of the intaglio pattern IP at the end portion EP may be smaller than a depth of the intaglio pattern IP at the central portion CP. The central portion CP may have the same depth d1 in the first direction DR1, and the end portion EP may have a depth d2 that decreases as the distance from the central portion CP in the first direction DR1 increases. That is, the end portion EP may be inclined at a predetermined angle based on the bottom surface in the central portion CP. The central portion CP may have a rectangular shape in a cross-section taken along a plane defined by the first direction DR1 and the third direction DR3. The end portion EP may have a right-angled trapezoid shape whose depth decreases in the first direction DR1 in the cross-section.

Figure 8:
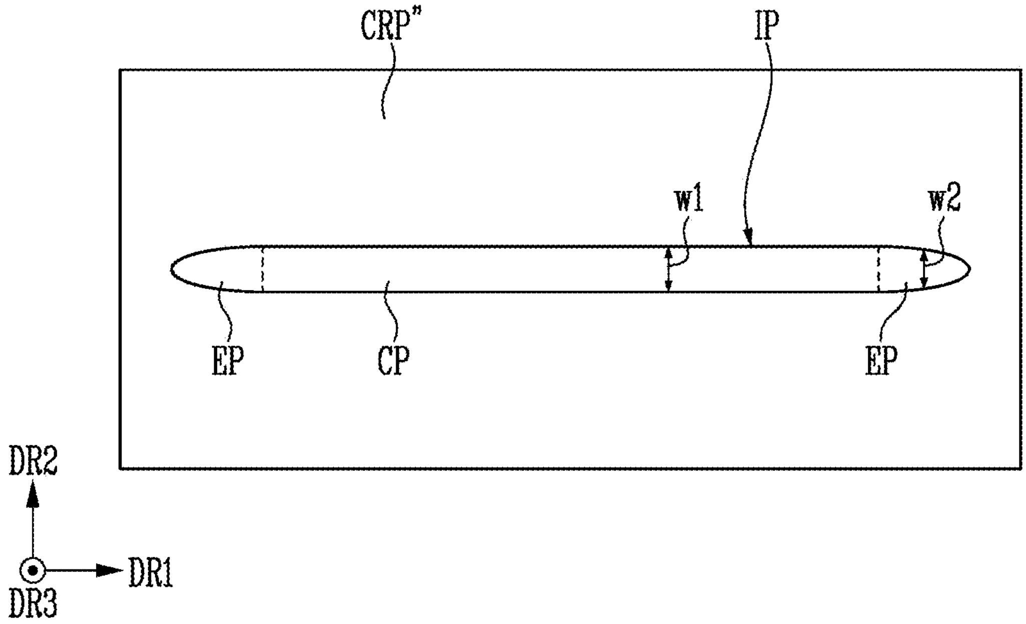
FIG. 8 is a cross-sectional view illustrating a corrosion plate according to another embodiment of the present disclosure.

FIG. 8 is a cross-sectional view illustrating a corrosion plate according to another embodiment of the present disclosure.

An intaglio pattern IP of a corrosion plate CRP" according to the present embodiment may be substantially the same as the intaglio pattern IP of the corrosion plate CRP described above, except for the planar shape of the intaglio pattern IP at the end portion EP. Therefore, any description that may overlap with the above-described content will be explained in an abbreviated manner or omitted.

Referring to FIG. 8, the corrosion plate CRP" may include the intaglio pattern IP.

A width w2 of the intaglio pattern IP at the end portion EP may be smaller than a width w1 of the intaglio pattern IP at the central portion CP. The central portion CP may have the same width w1 in the first direction DR1, and the end portion EP may have the width w2 that decreases as the distance from the central portion CP in the first direction DR1 increases. That is, the central portion CP may have a rectangular shape on a plane. The end portion EP may have a semi-elliptical shape whose width decreases in the first direction DR1 on the plane.

FIGS. 9 to 21 are diagrams illustrating a method of manufacturing a window according to an embodiment of the present disclosure.

FIGS. 9 to 21 show a method of manufacturing the window WD described above with reference to FIGS. 1 and 2. In addition, FIGS. 9 to 21 show a method of manufacturing the window WD using the corrosion plate CRP described with reference to FIGS. 3 to 6. Here, FIG. 14 is a plan view of FIG. 13, FIG. 17 is a plan view of FIG. 16, and FIG. 20 is a plan view of FIG. 19.

Referring to FIGS. 9 to 14, a first printed pattern PP1 may be printed on a base substrate BS using the corrosion plate CRP. For example, the first printed pattern PP1 may be printed on the bezel area BA of FIGS. 1 and 2.

Figure 9:
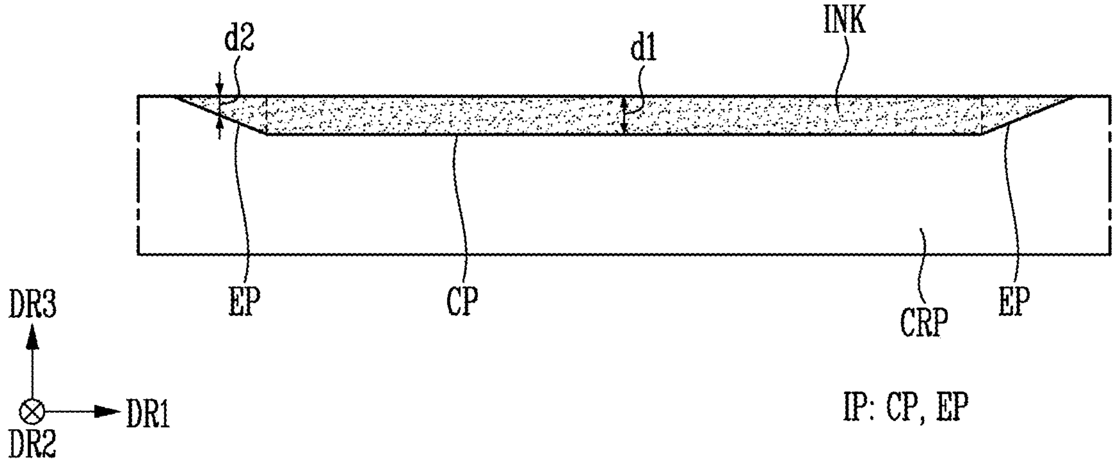
FIGS. 9 to 21 are diagrams illustrating a method of manufacturing a window according to an embodiment of the present disclosure.

Referring to FIG. 9, printing ink INK may be deposited into the groove or the intaglio pattern in the corrosion plate CRP. Specifically, the corrosion plate CRP may include the intaglio pattern IP having different cross-sectional areas at the end portion EP and the central portion CP. The depth d2 and width of the intaglio pattern IP at the end portion EP may be smaller than the depth d1 and width of the intaglio pattern IP at the central portion CP. The printing ink INK may fill the intaglio pattern IP of the corrosion plate CRP such that the ink surface is level with the surface of the corrosion plate CRP.

Figure 10:
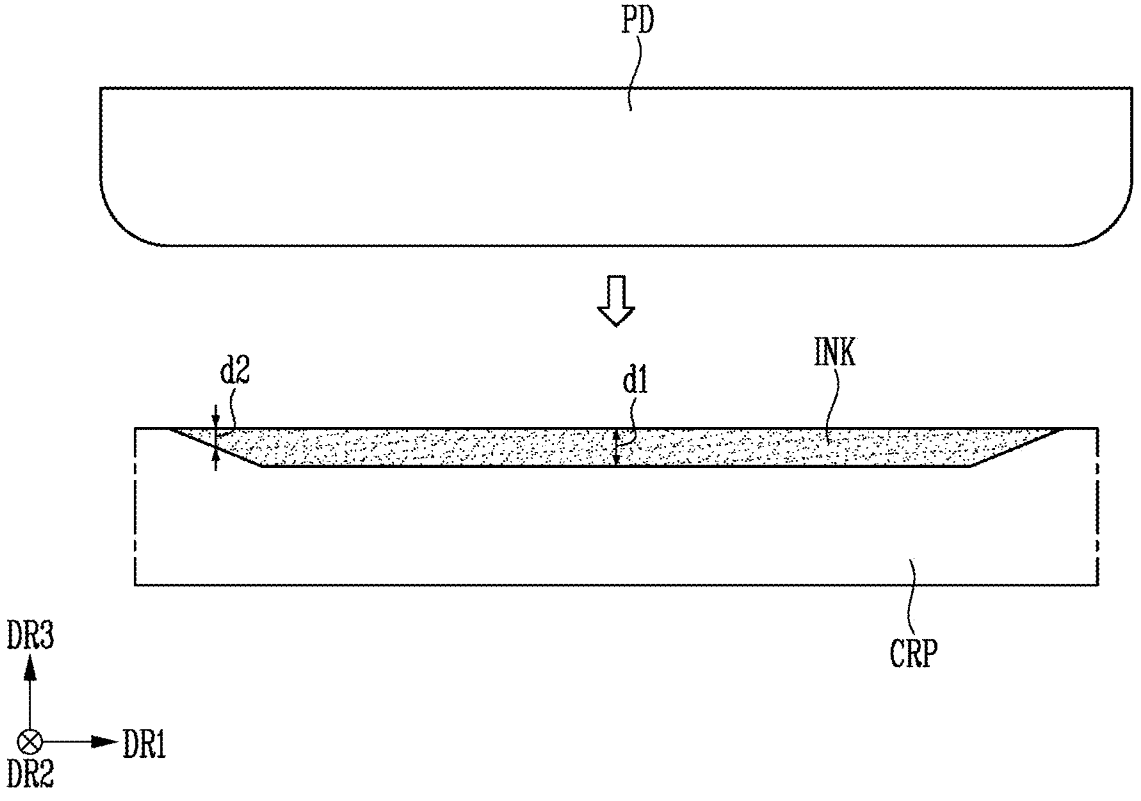
Figure 11:
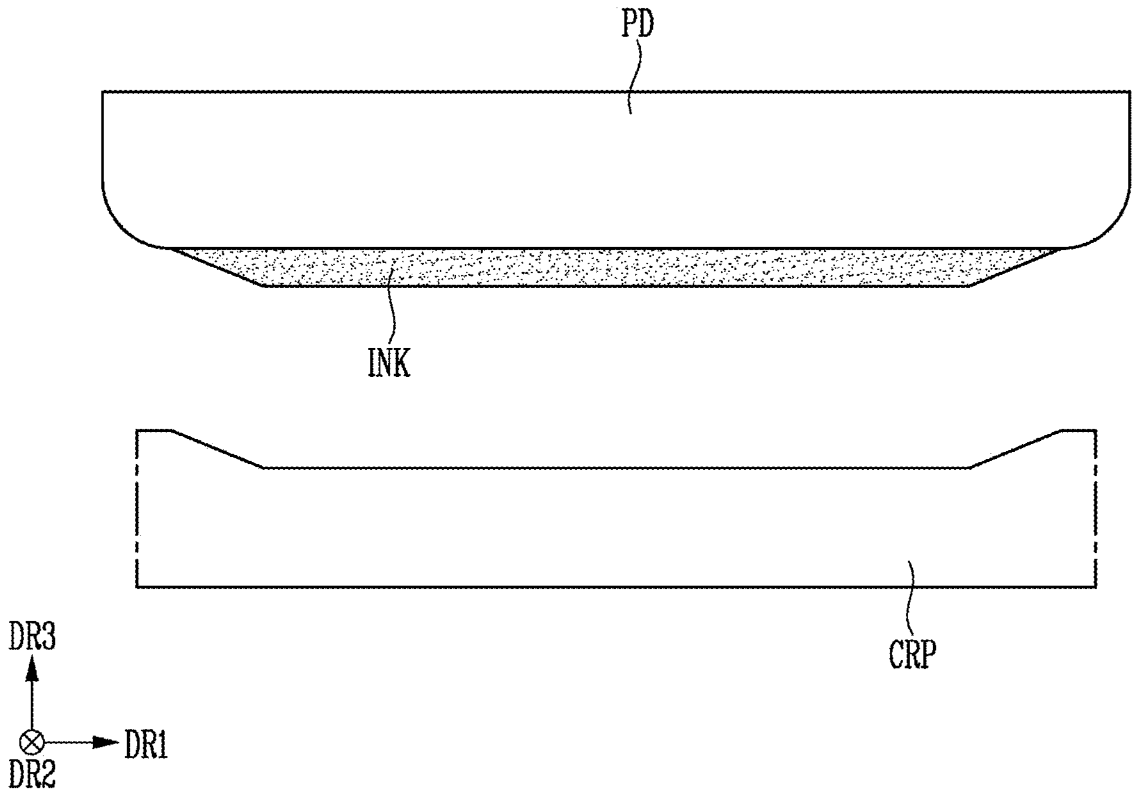

Referring to FIGS. 10 and 11, the printing ink INK may be applied to the pad PD by pressing the pad PD against the corrosion plate CRP.

Figure 12:
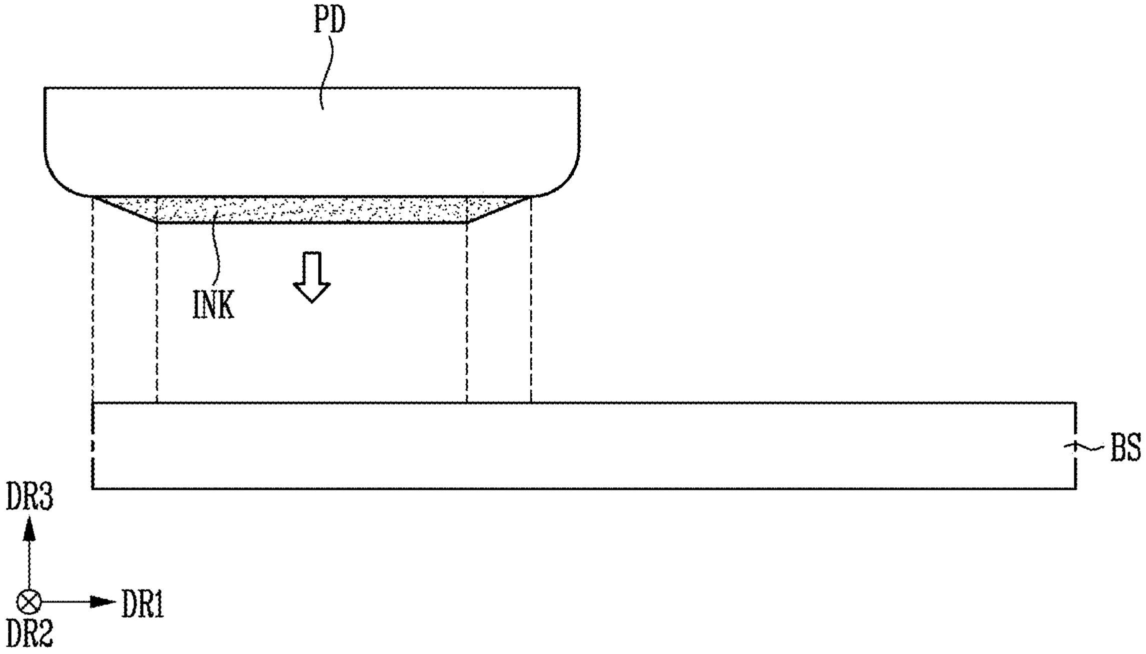
Figure 13:
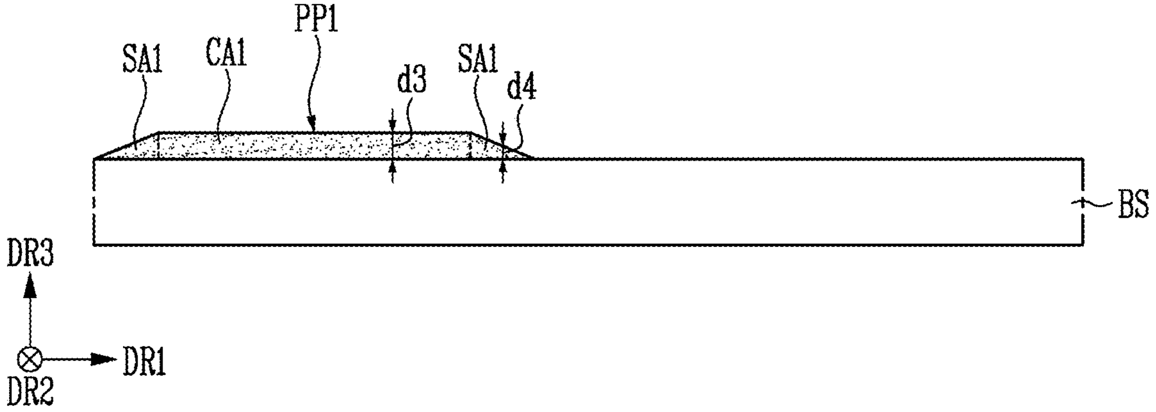
Figure 14:
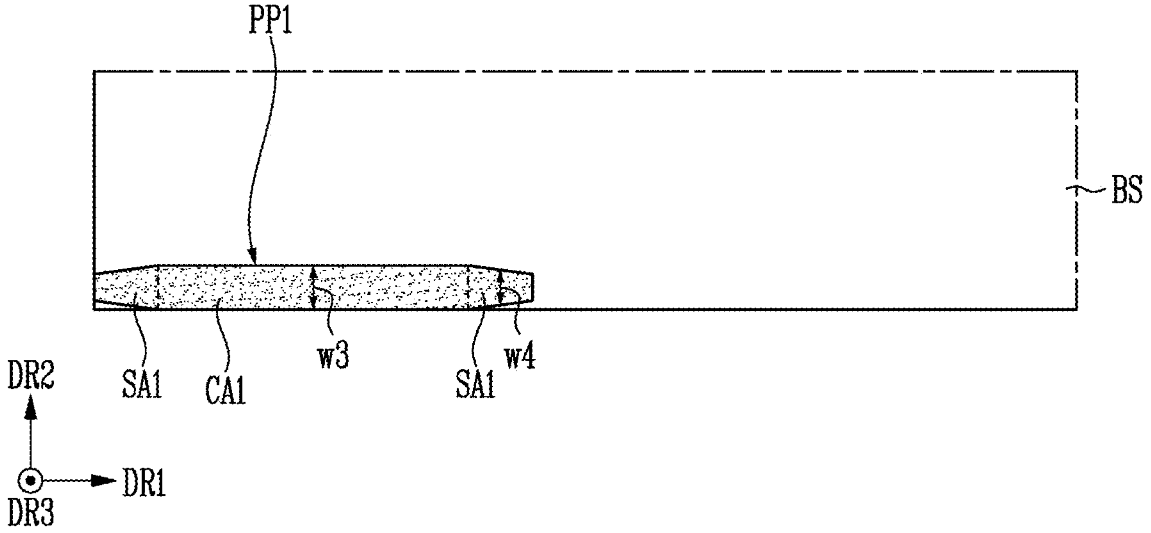

Referring to FIGS. 12 to 14, the first printed pattern PP1 may be printed on the base substrate BS by pressing the pad PD on which the printing ink INK is applied to the base substrate BS.

In an embodiment, the first printed pattern PP1 may be formed by transferring the printing ink INK in the intaglio pattern IP. Accordingly, the first printed pattern PP1 may have a shape corresponding to the intaglio pattern IP. That is, the first printed pattern PP1 may extend in the first direction DR1, and a cross-sectional area of the first printed pattern PP1 may mean an area taken along a plane perpendicular to the first direction DR1.

In the first printed pattern PP1, a portion corresponding to the end portion EP of the intaglio pattern IP may be defined as a first sub-area SA1. In the first printed pattern PP1, a portion corresponding to the central portion CP of the intaglio pattern IP may be defined as a first central area CA1. Accordingly, the first central area CA1 may be located between two first sub-areas SA1.

The first printed pattern PP1 in the first central area CA1 may have a width w3 defined in the second direction DR2 and a thickness d3 defined in the third direction DR3. The first printed pattern PP1 in the first sub-area SA1 may also have a width w4 defined in the second direction DR2 and a thickness d4 defined in the third direction DR3.

In an embodiment, a cross-sectional area of the first printed pattern PP1 in the first sub-area SA1 may be smaller than a cross-sectional area of the first printed pattern PP1 in the first central area CA1. The first printed pattern PP1 in the first central area CA1 may have the same cross-sectional area in the first direction DR1. However, the first printed pattern PP1 in the first sub-area SA1 may have a cross-sectional area that decreases with distance from the first central area CA1 in the first direction DR1. That is, in the first printed pattern PP1, the boundary between the first central area CA1 and the first sub-area SA1 may be where the cross-sectional area of the first printed pattern PP1 begins to decrease.

Since the central portion CP of the intaglio pattern IP and the first central area CA1 of the first printed pattern PP1 correspond to each other, the depth d1 and width w1 of the intaglio pattern IP at the central portion CP shown in FIGS. 3 and 6 may be substantially the same as the thickness d3 and width w3 of the first printed pattern PP1 in the first central area CA1. Likewise, since the end portion EP of the intaglio pattern IP and the first sub-area SA1 of the first printed pattern PP1 correspond to each other, the depth d2 and width w2 of the intaglio pattern IP at the end portion EP may be substantially the same as the thickness d4 and width w4 of the first printed pattern PP1 in the first sub-area SA1.

For example, the width w4 of the first printed pattern PP1 in the first sub-area SA1 may be smaller than the width w3 of the first printed pattern PP1 in the first central area CA1. The first central area CA1 may be formed to have the same width w3 in the first direction DR1, and the first sub-area SA1 may be formed to have the width w4 that decreases as the distance from the first central area CA1 in the first direction DR1 increases. That is, the first central area CA1 may be formed in a rectangular shape on a plane. The first sub-area SA1 may be formed in a trapezoidal shape whose width decreases in the first direction DR1 in plan view. The first sub-area SA1 may have an equilateral trapezoidal shape in plan view.

In addition, the thickness d3 of the first printed pattern PP1 in the first sub-area SA1 may be smaller than the thickness d4 of the first printed pattern PP1 in the first central area CA1. The first central area CA1 may be formed to have the same thickness d3 in the first direction DR1, and the first sub-area SA1 may be formed to have the thickness d4 that decreases with distance from the first central area CA1 in the first direction DR1. That is, a surface of the first sub-area SA1 may be inclined at a predetermined angle relative to the upper surface in the first central area CA1. The first central area CA1 may have a rectangular shape in a cross-section taken along a plane defined by the first direction DR1 and the third direction DR3. The first sub-area SA1 may have a triangular shape whose depth decreases in the first direction DR1 in the same cross section.

Referring to FIGS. 9 to 11 and 15 to 17, a second printed pattern PP2 may be printed on the base substrate BS using the corrosion plate CRP.

According to the steps of FIGS. 9 to 11, the printing ink INK may be deposited into the corrosion plate CRP. The printing ink INK may be then be transferred to the pad PD from the corrosion plate CRP by pressing the pad PD against the corrosion plate CRP.

Figure 15:
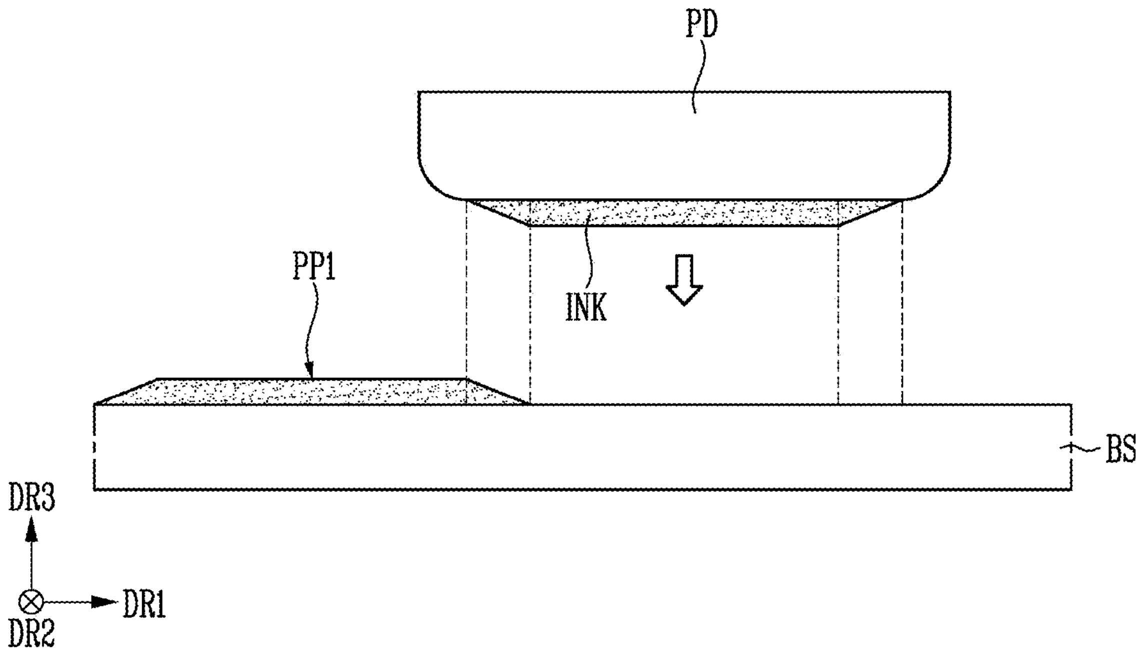
Figure 16:
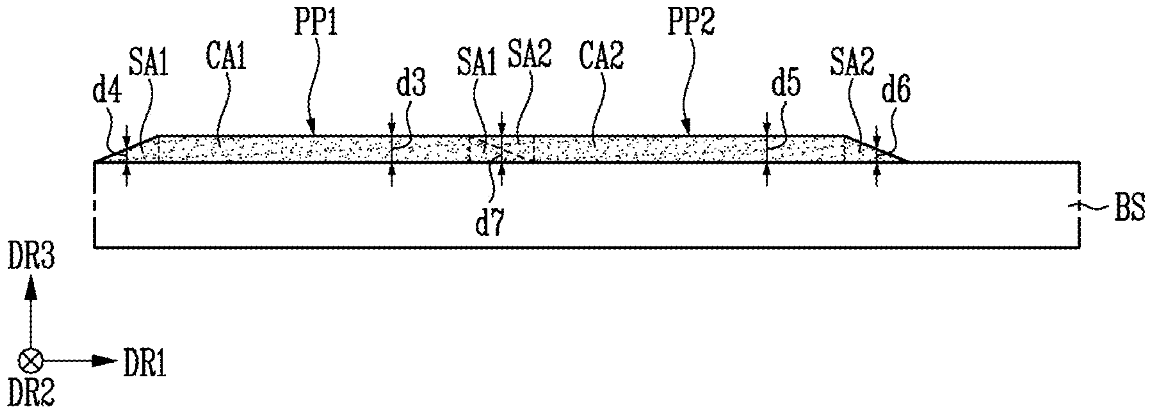
Figure 17:
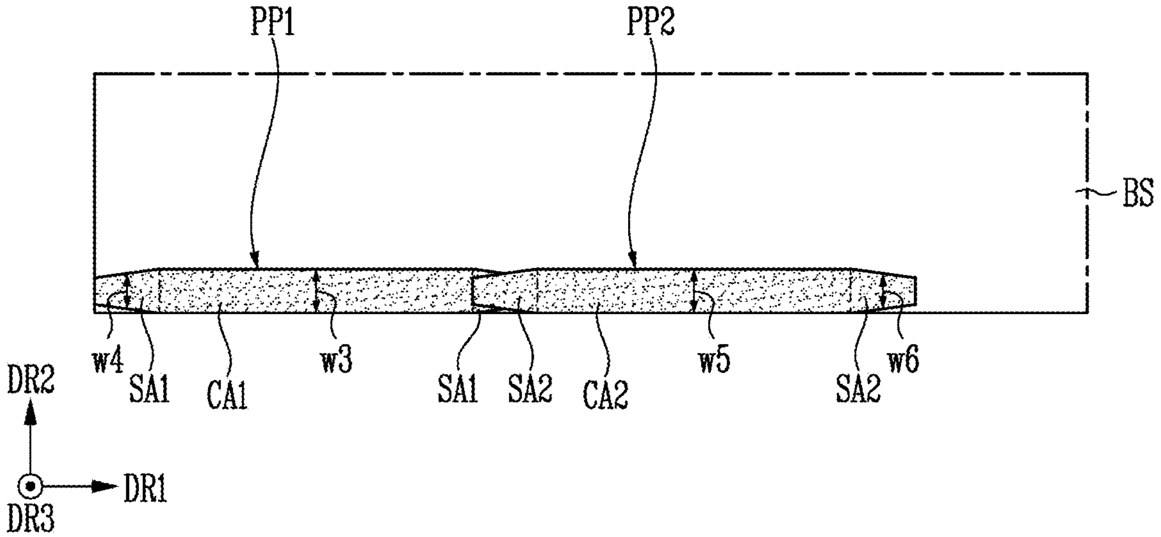

Referring to FIGS. 15 to 17, the second printed pattern PP2 may be printed on the base substrate BS to partially overlap the first printed pattern PP1 by pressing the pad PD with the printing ink INK against the base substrate BS.

The second printed pattern PP2 may be formed by transferring the printing ink INK in the intaglio pattern IP. Accordingly, the second printed pattern PP2, like the first printed pattern PP1, may have a shape corresponding to the intaglio pattern IP. That is, the second printed pattern PP2 may also extend in the first direction DR1, and a cross-sectional area of the second printed pattern PP2 may mean an area taken along a plane perpendicular to the first direction DR1.

In the second printed pattern PP2, a portion corresponding to the end portion EP of the intaglio pattern IP may be defined as a second sub-area SA2. In the second printed pattern PP2, a portion corresponding to the central portion CP of the intaglio pattern IP may be defined as a second central area CA2. Accordingly, the second central area CA2 may be located between two second sub-areas SA2.

The second printed pattern PP2 in the second central area CA2 may have a width w5 defined in the second direction DR2 and a thickness d6 defined in the third direction DR3. The second printed pattern PP2 in the second sub-area SA2 may also have a width w6 defined in the second direction DR2 and a thickness d6 defined in the third direction DR3.

In an embodiment, a cross-sectional area of the second printed pattern PP2 in the second sub-area SA2 may be smaller than a cross-sectional area of the second printed pattern PP2 in the second central area CA2. The second printed pattern PP2 in the second central area CA2 may have the same cross-sectional area in the first direction DR1. However, the second printed pattern PP2 in the second sub-area SA2 may have a cross-sectional area that decreases with distance from the second central area CA2 in the first direction DR1. That is, in the second printed pattern PP2, the boundary between the second central area CA2 and the second sub-area SA2 may be where the cross-sectional area of the second printed pattern PP2 begins to decrease.

Since the central portion CP of the intaglio pattern IP and the second central area CA2 of the second printed pattern PP2 correspond to each other, the depth d1 and width w1 of the intaglio pattern IP at the central portion CP shown in FIGS. 3 and 6 may be substantially the same as the thickness d5 and width w5 of the second printed pattern PP2 in the second central area CA2. Likewise, since the end portion EP of the intaglio pattern IP and the second sub-area SA2 of the second printed pattern PP2 correspond to each other, the depth d2 and width w2 of the intaglio pattern IP at the end portion EP may be substantially the same as the thickness d6 and width w6 of the second printed pattern PP2 in the second sub-area SA2.

For example, the width w6 of the second printed pattern PP2 in the second sub-area SA2 may be smaller than the width w5 of the second printed pattern PP2 in the second central area CA2. The second central area CA2 may be formed to have the same width w6 in the first direction DR1, and the second sub-area SA2 may be formed to have the width w6 that decreases with distance from the second central area CA2 in the first direction DR1. That is, the second central area CA2 may be formed in a rectangular shape on a plane. The second sub-area SA2 may be formed in a trapezoidal shape whose width decreases in the first direction DR1 on the plane. Preferably, the second sub-area SA2 may be formed in an equilateral trapezoidal shape on the plane. However, embodiments according to the present disclosure are not limited thereto.

In addition, the thickness d6 of the second printed pattern PP2 in the second sub-area SA2 may be smaller than the thickness d5 of the second printed pattern PP2 in the second central area CA2. The second central area CA2 may be formed to have the same thickness d5 in the first direction DR1, and the second sub-area SA2 may be formed to have the thickness d6 that decreases as the distance from the second central area CA2 in the first direction DR1 increases. That is, the second sub-area SA2 may be inclined at a predetermined angle based on the upper surface in the second central area CA2. The second central area CA2 may be formed in a rectangular shape in a cross-section taken along a plane defined by the first direction DR1 and the third direction DR3. The second sub-area SA2 may be formed in a triangular shape whose depth decreases in the first direction DR1 in the same cross section.

In an embodiment, the second printed pattern PP2 may be printed so that a portion of the first printed pattern PP1 and a portion of the second printed pattern PP2 overlap each other. That is, the first sub-area SA1 of the first printed pattern PP1 and the second sub-area SA2 of the second printed pattern PP2 that are adjacent to each other may be printed to overlap each other at least partially. Since the printed pattern PP is made of fluid printing ink, the first sub-area SA1 and the second sub-area SA2 that overlap each other may be integrated without maintaining their previous shapes.

For example, the first sub-area SA1 of the first printed pattern PP1 and the second sub-area SA2 of the second printed pattern PP2 that are adjacent to each other may overlap each other. That is, a boundary between the first central area CA1 and the first sub-area SA1 of the first printed pattern PP1 and the edge of the second sub-area SA2 of the second printed pattern PP2 may be aligned. Likewise, a boundary between the second central area CA2 and the second sub-area SA2 of the second printed pattern PP2 and the edge of the first sub-area SA1 of the first printed pattern PP1 may be aligned. An "edge," as used herein, refers to an end of a printed pattern.

Figure 18:
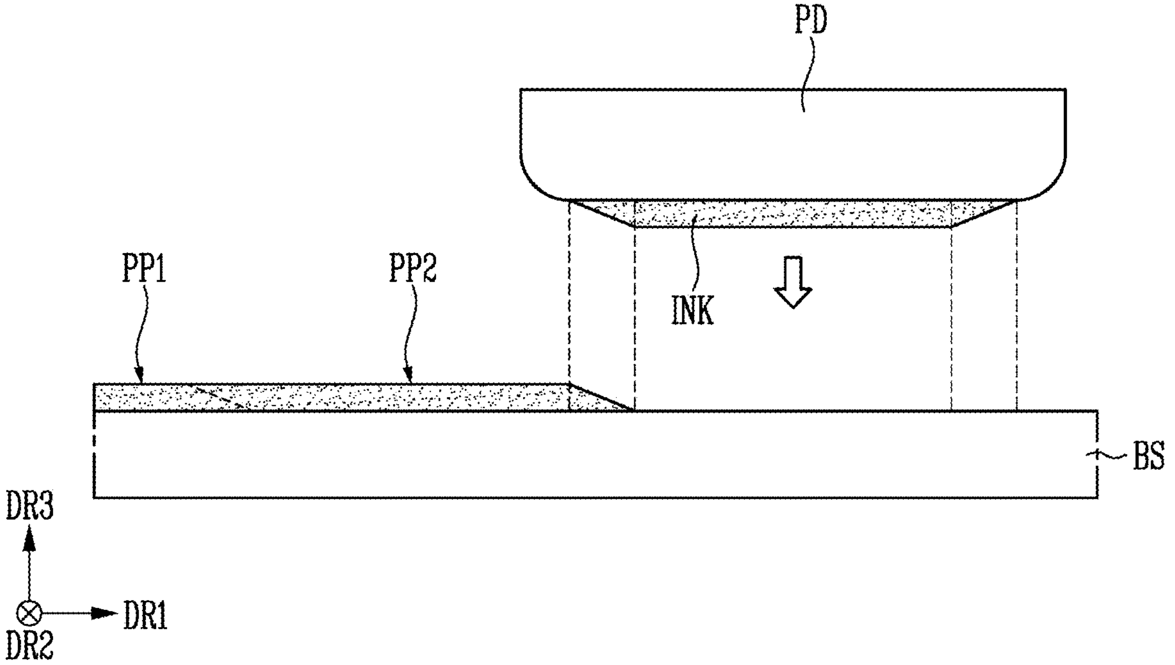
Figure 19:
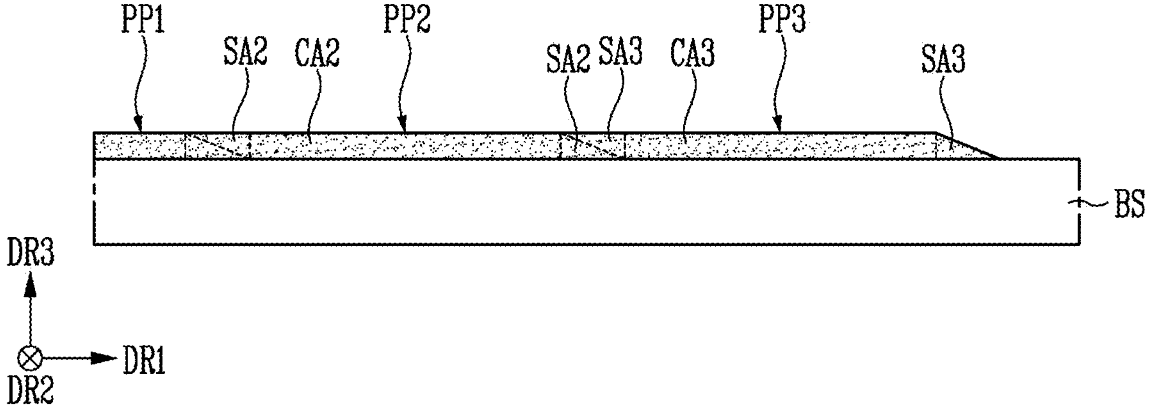
Figure 20:
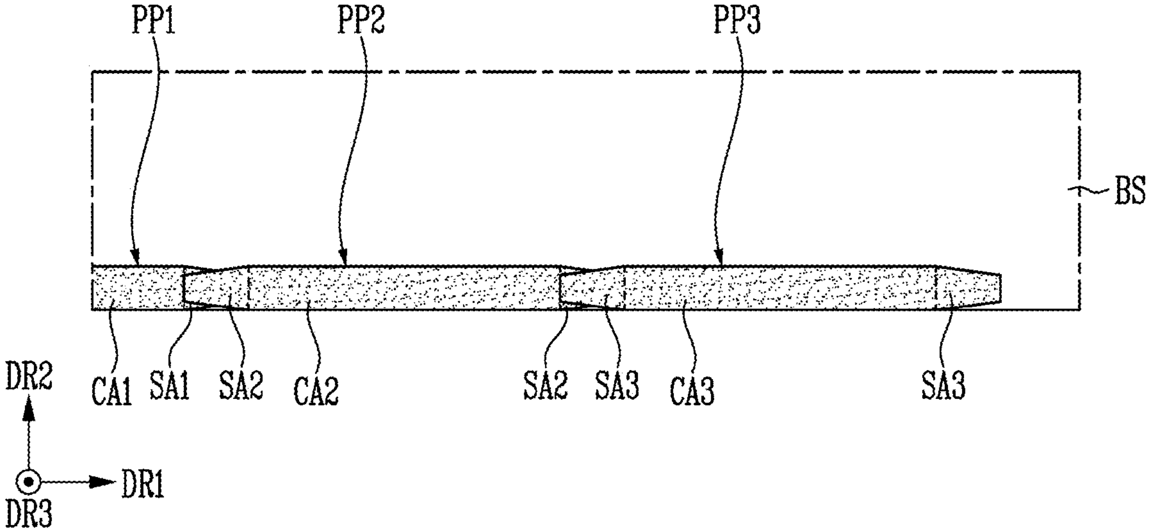

In the first printed pattern PP1 and the second printed pattern PP2, the first sub-area SA1 and the second sub-area SA2 having relatively small cross-sectional areas (for example, at least one of thickness and width) may overlap each other, as depicted in FIG. 18 and FIG. 19. Therefore, it is possible to prevent the cross-sectional area in the overlapping area from becoming excessively large compared to the cross-sectional area in the non-overlapping area (for example, the first central area CA1 and the second central area CA2), or a step may form between the first printed pattern PP1 and the second printed pattern PP2.

For example, even if the first sub-area SA1 of the first printed pattern PP1 and the second sub-area SA2 of the second printed pattern PP2 overlap each other, a combined thickness d7 (depicted in FIG. 16) of the first sub-area SA1 and the second sub-area SA2 that overlap each other may be substantially similar to the thickness d3 of the first central area CA1 and the thickness d5 of the second central area CA2.

In addition, even if the first sub-area SA1 of the first printed pattern PP1 and the second sub-area SA2 of the second printed pattern PP2 overlap each other, since the first sub-area SA1 and the second sub-area SA2 that overlap each other have inclined surfaces, it is possible to prevent a step from forming.

Referring to FIGS. 18 to 20, a third printed pattern PP3 may be printed on the base substrate BS to partially overlap the second printed pattern PP2 by pressing the pad PD on which the printing ink INK is applied to the base substrate BS.

The third printed pattern PP3 may be formed by transferring the printing ink INK in the intaglio pattern IP. Accordingly, the third printed pattern PP3, like the first printed pattern PP1 and the second printed pattern PP2, may have a shape corresponding to the intaglio pattern IP.

In the third printed pattern PP3, a portion corresponding to the end portion EP of the intaglio pattern IP may be defined as a third sub-area SA3. In the third printed pattern PP3, a portion corresponding to the central portion CP of the intaglio pattern IP may be defined as a third central area CA3. Accordingly, the third central area CA3 may be located between two third sub-areas SA3.

Like the first printed pattern PP1 and the second printed pattern PP2, the third printed pattern PP3 may be printed so that a portion of the second printed pattern PP2 and a portion of the third printed pattern PP3 overlap each other. For example, the second sub-area SA2 of the second printed pattern PP2 and the third sub-area SA3 of the third printed pattern PP3 may overlap each other at least partially. As described above, since the printed pattern PP is made of fluid printing ink, the second sub-area SA2 and the third sub-area SA3 that overlap each other may be integrated without maintaining their previous shapes.

Figure 21:
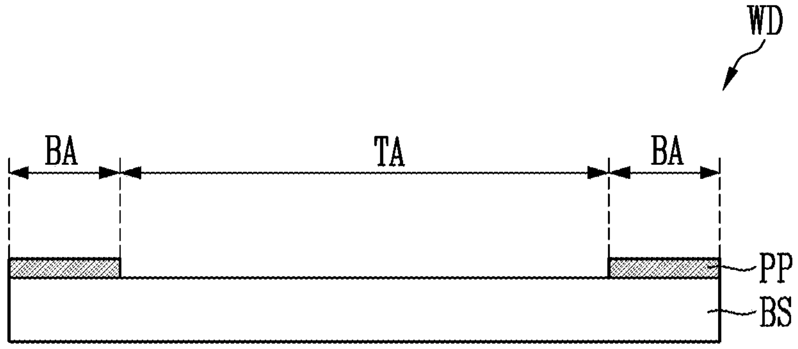

Referring to FIG. 21, as described above, by repeating the printing process of the first printed pattern PP1, the printed pattern PP may be printed on the base substrate BS and the window WD may be formed. An area where the printed pattern PP is printed may be formed as the bezel area BA, and an area where the printed pattern PP is not printed may be formed as the transmission area TA.

The window WD, that is, the base substrate BS, may have a larger size compared to the corrosion plate CRP and the pad PD. Therefore, it may be difficult to form the printed pattern PP on the base substrate BS through a single printing process. That is, by repeating the above-described printing process using the corrosion plate CRP and the pad PD, the entire printed pattern PP can be formed on the base substrate BS.

FIGS. 22 to 25 are diagrams illustrating a method of manufacturing a window according to another embodiment of the present disclosure.

Figure 23:
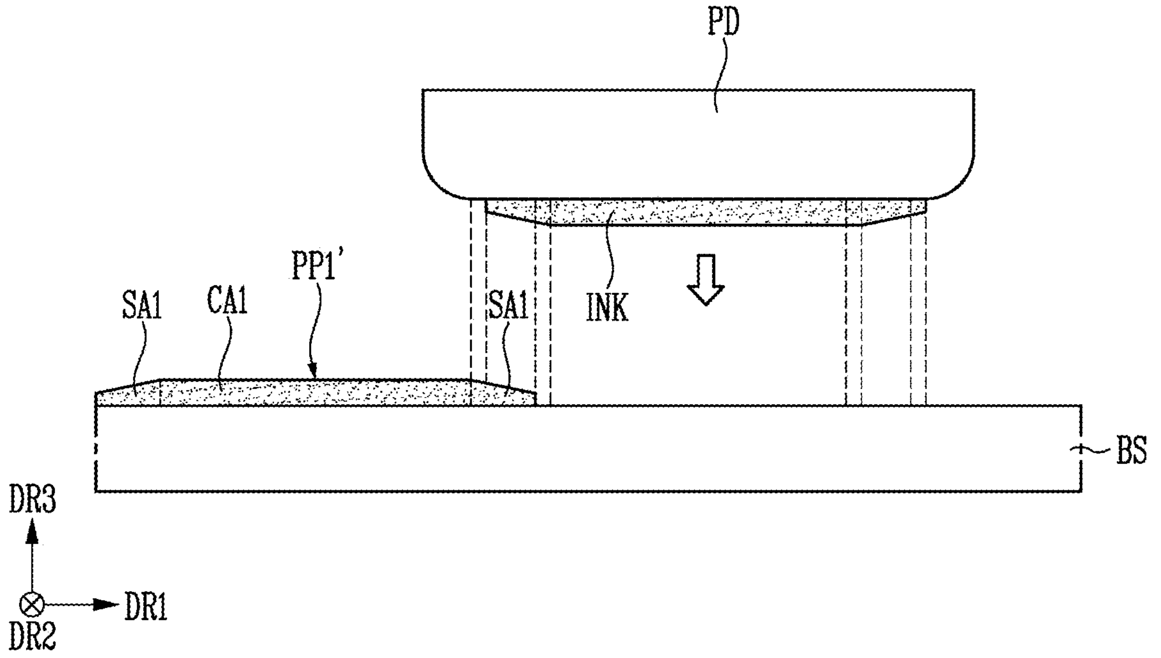
Figure 24:
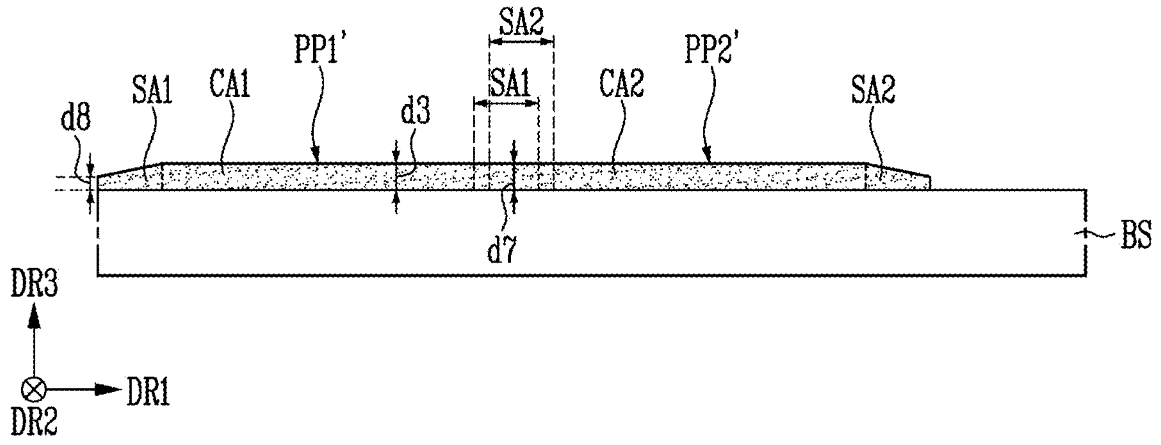
Figure 25:
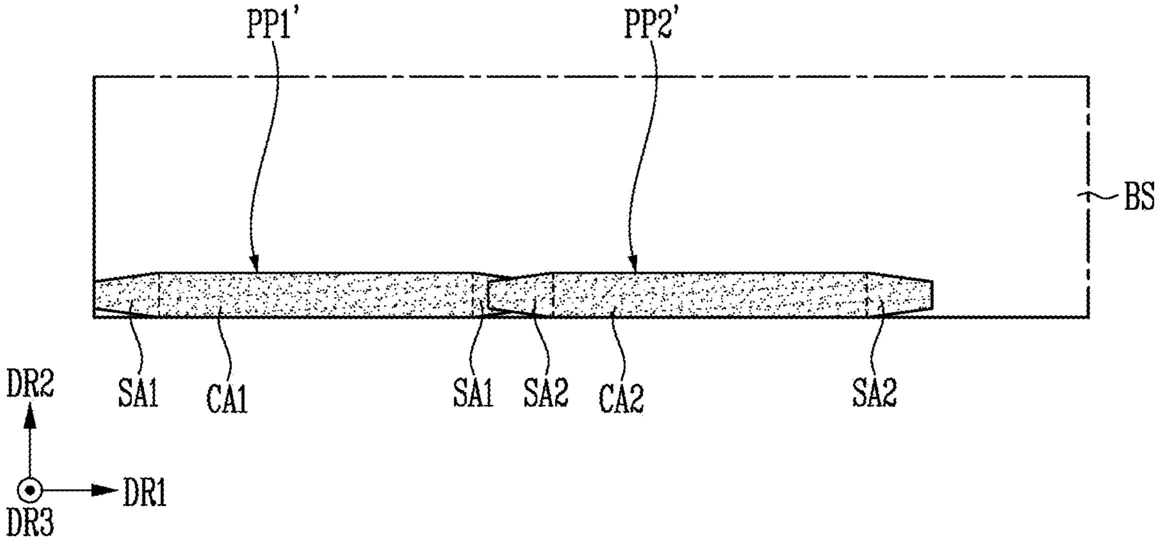

FIGS. 22 to 25 show a method of manufacturing a window using the corrosion plate CRP' described with reference to FIG. 7. Here, FIG. 25 is a plan view of FIG. 24.

The method of manufacturing the window according to the present embodiment may be substantially the same as the method of manufacturing the window WD described above, except for the shapes and degree of overlap of a first printed pattern PP1' and a second printed pattern PP2'. Therefore, any description that may overlap with the above-described content will be explained in an abbreviated manner or omitted.

Referring to FIGS. 22 to 25, the first printed pattern PP1' and the second printed pattern PP2' may be printed on a base substrate BS using the corrosion plate CRP'.

Figure 22:
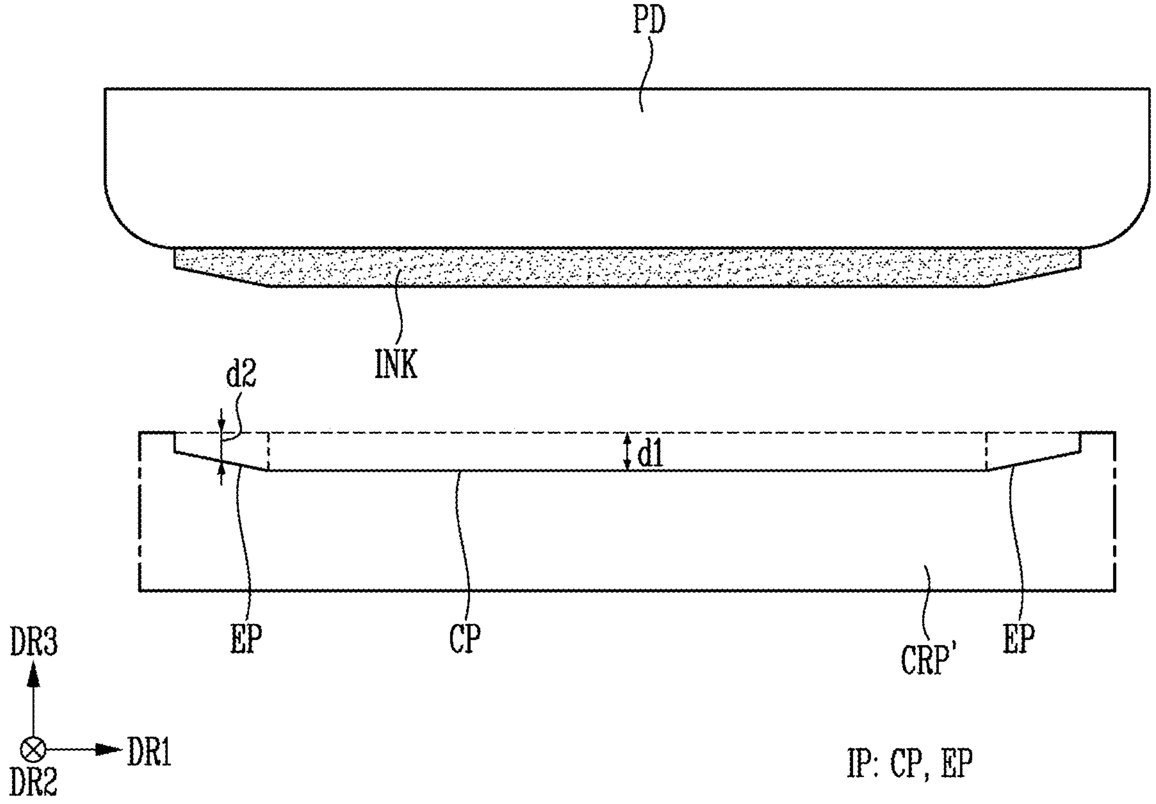
FIGS. 22 to 25 are diagrams illustrating a method of manufacturing a window according to another embodiment of the present disclosure.

Referring to FIG. 22, printing ink INK may be deposited in a groove of the corrosion plate CRP'. The groove may be the intaglio pattern IP having different cross-sectional areas at the end portion EP and the central portion CP. The depth d2 and width of the intaglio pattern IP at the end portion EP may be smaller than the depth d1 and width of the intaglio pattern IP at the central portion CP. The printing ink INK may be applied to the pad PD by pressing the pad PD to the corrosion plate CRP'.

Referring to FIG. 23, the first printed pattern PP1' may be printed on the base substrate BS by pressing the pad PD on which the printing ink INK is applied to the base substrate BS.

In an embodiment, the first printed pattern PP1' may be formed by transferring the printing ink INK from the intaglio pattern IP to the base substrate. Accordingly, the first printed pattern PP1' may have a shape corresponding to the intaglio pattern IP. That is, a cross-sectional area of the first printed pattern PP1' in the first sub-area SA1 may be smaller than a cross-sectional area of the first printed pattern PP1' in the first central area CA1. In addition, the first central area CA1 may have a rectangular shape in a cross-section. The first sub-area SA1 may have a right-angled trapezoidal shape whose depth decreases in the first direction DR1 in the cross-section.

In addition, after the first printed pattern PP1' is printed, more printing ink INK may be deposited in the corrosion plate CRP' of FIG. 22. The printing ink INK may be attached to the pad PD by pressing the pad PD against the corrosion plate CRP'.

Referring to FIGS. 24 and 25, the second printed pattern PP2' may be printed on the base substrate BS to partially overlap the first print pattern PP1' by pressing the pad PD on which the printing ink INK is applied to the base substrate BS.

The second printed pattern PP2', like the first printed pattern PP1', may have a shape corresponding to the intaglio pattern IP. That is, a cross-sectional area of the second printed pattern PP2' in the second sub-area SA2 may be smaller than a cross-sectional area of the second printed pattern PP2' in the second central area CA2. In addition, the second central area CA2 may have a rectangular shape in a cross section. The first sub-area SA1 may have a right-angled trapezoidal shape whose thickness decreases in the first direction DR1 in the cross-section.

In an embodiment, the second printed pattern PP2' may be printed so that a portion of the first printed pattern PP1' and a portion of the second printed pattern PP2' overlap each other. For example, the first sub-area SA1 of the first printed pattern PP1' and the second sub-area SA2 of the second printed pattern PP2' that are adjacent to each other may be printed to overlap each other in at least one area. Since the printed pattern PP is made of fluid printing ink, the first sub-area SA1 and the second sub-area SA2 that overlap each other may be formed as one piece without maintaining their previous shapes.

For example, the first sub-area SA1 of the first printed pattern PP1' and the second sub-area SA2 of the second printed pattern PP2' that are adjacent to each other may partially overlap each other. That is, a boundary between the first central area CA1 and the first sub-area SA1 of the first printed pattern PP1' and an edge of the second sub-area SA2 of the second printed pattern PP2' may be offset relative to each other in the first direction DR1 (see FIG. 24). Likewise, a boundary between the second central area CA2 and the second sub-area SA2 of the second printed pattern PP2' and an edge of the first sub-area SA1 of the first printing pattern PP1' may be offset relative to each other in the first direction DR1. Accordingly, the first sub-area SA1 of the first printed pattern PP1' and the second sub-area SA2 of the second printed pattern PP2' that are adjacent to each other may overlap partially.

In the first printed pattern PP1' and the second printed pattern PP2', the first sub-area SA1 and the second sub-area SA2 having relatively small cross-sectional areas (for example, at least one of thickness and width) may overlap each other. Therefore, it is possible to prevent the cross-sectional area in the overlapping area from increasing dramatically compared to the cross-sectional area in the non-overlapping area, or a step difference from occurring between the first printed pattern PP1' and the second printed pattern PP2' on a plane.

In addition, since the first sub-area SA1 has a right-angled trapezoidal shape whose thickness decreases in the first direction DR1 in a cross-section, a predetermined thickness d8 may exist at the edge of the first sub-area SA1, unlike when the cross-section has a triangular shape. Therefore, if the first sub-area SA1 and the second sub-area SA2 that are adjacent to each other overlap each other entirely, the thickness at a boundary between the first sub-area SA1 and the first central area CA1 that are adjacent to each other and a boundary between the second sub-area SA2 and the second central area CA2 may be relatively greater than the thickness d3 in the non-overlapping area (for example, the first central area CA1 and the second central area CA2). Therefore, the first sub-area SA1 and the second sub-area SA2 that are adjacent to each other are partially overlapped, to make the thickness d7 in the overlapping area the same as the thickness d3 in the non-overlapping.

Figure 26:
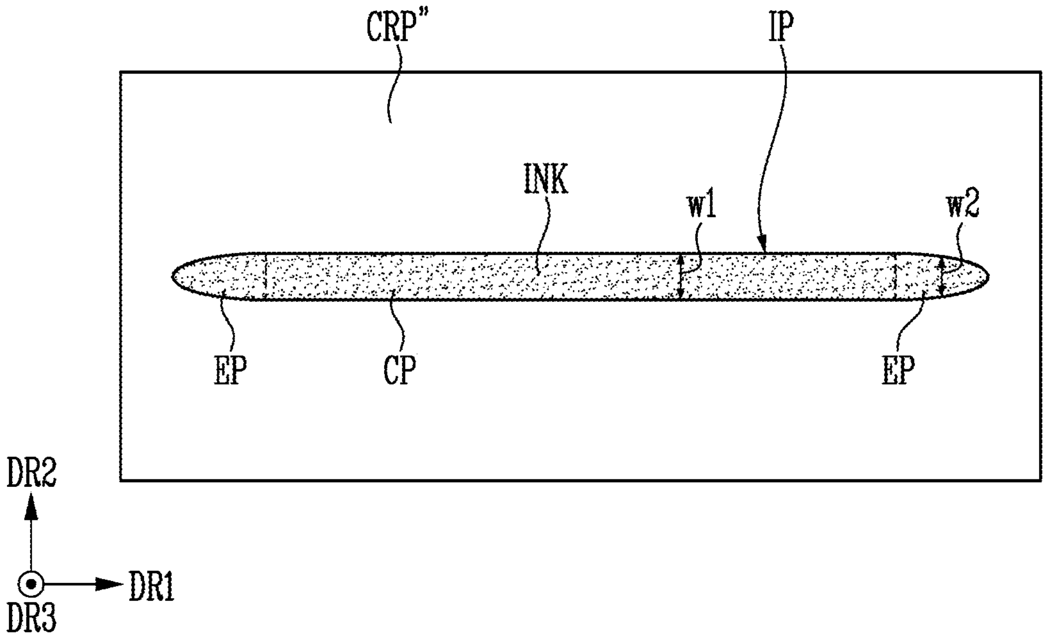
FIGS. 26 and 27 are diagrams illustrating a method of manufacturing a window according to still another embodiment of the present disclosure.
Figure 27:
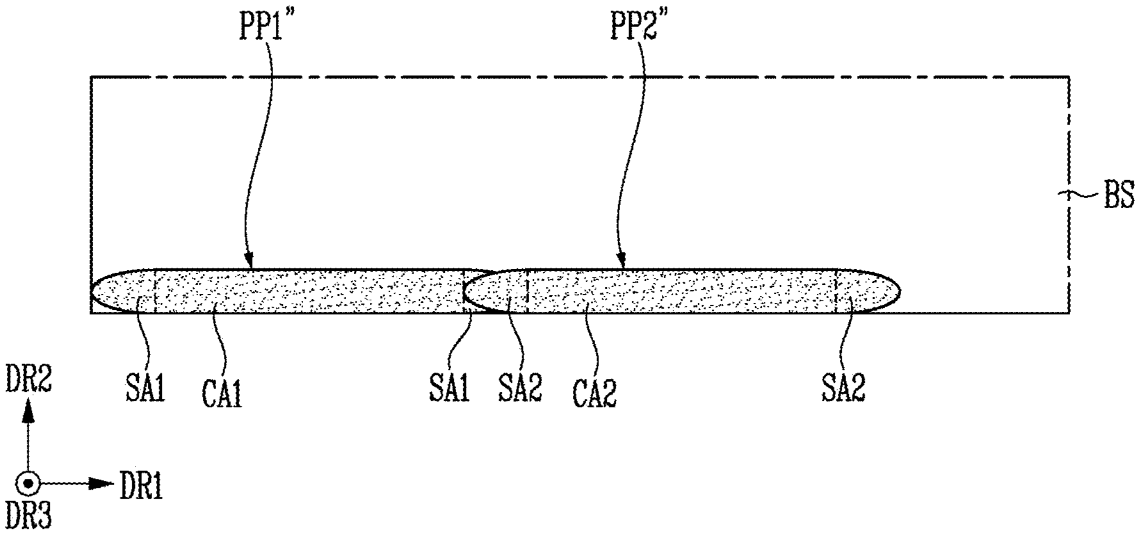

FIGS. 26 and 27 are diagrams illustrating a method of manufacturing a window according to still another embodiment of the present disclosure.

FIGS. 26 and 27 show a method of manufacturing a window using the corrosion plate CRP" described with reference to FIG. 8.

The method of manufacturing the window according to the present embodiment may be substantially the same as the method of manufacturing the window WD described above, except for the shapes of a first printed pattern PP1" and a second printed pattern PP2". Therefore, content that may overlap with the above-described content will be explained in an abbreviated manner or omitted.

Referring to FIGS. 26 and 27, the first printed pattern PP1" and the second printed pattern PP2" may be printed on a base substrate BS using the corrosion plate CRP".

Referring to FIG. 27, printing ink INK may be deposited into the corrosion plate CRP". The corrosion plate CRP" may include the intaglio pattern IP having different cross-sectional areas at the end portion EP and the central portion CP. The depth and width w2 of the intaglio pattern IP at the end portion EP may be smaller than the depth and width w1 of the intaglio pattern IP at the center portion CP. The printing ink INK may be disposed on the pad PD by pressing the pad PD of FIG. 10 against the corrosion plate CRP".

Referring to FIG. 27, the first printed pattern PP1" may be printed on the base substrate BS by pressing the pad PD on which the printing ink INK is applied against the base substrate BS.

In an embodiment, the first printed pattern PP1" may be formed by transferring the printing ink INK from the intaglio pattern IP. Accordingly, the first printed pattern PP1" may have a shape corresponding to the intaglio pattern IP. That is, a cross-sectional area of the first printed pattern PP1" in the first sub-area SA1 may be smaller than a cross-sectional area of the first printed pattern PP1" in the first central area CA1. In addition, the first central area CA1 may have a rectangular shape on a plane. The first sub-area SA1 may have a semi-elliptical shape whose width decreases in the first direction DR1 on the plane.

In addition, after the first printed pattern PP1" is printed, the printing ink INK may be refilled into the corrosion plate CRP" of FIG. 26. The printing ink INK may be reapplied to the pad PD by pressing the pad PD against the corrosion plate CRP".

The second printed pattern PP2" may be printed on the base substrate BS to partially overlap the first printed pattern PP1" by pressing the pad PD on which the printing ink INK is applied against the base substrate BS.

The second printed pattern PP2", like the first printed pattern PP1", may have a shape corresponding to the intaglio pattern IP. That is, a cross-sectional area of the second printed pattern PP2" in the second sub-area SA2 may be smaller than a cross-sectional area of the second printed pattern PP2" in the second central area CA2. In addition, the first central area CA1 may have a rectangular shape in plan view. The first sub-area SA1 may have a semi-elliptical shape whose width decreases in the first direction DR1 in plan view (depicted in FIG. 26).

In an embodiment, the second printed pattern PP2" may be printed so that a portion of the first printed pattern PP1" and a portion of the second printed pattern PP2" overlap each other. For example, the first sub-area SA1 of the first printed pattern PP1" and the second sub-area SA2 of the second printed pattern PP2" may be printed to overlap each other at least partially. Since the printed pattern PP is made of fluid printing ink, the first sub-area SA1 and the second sub-area SA2 that overlap each other may be formed as one piece without maintaining their previous shapes.

In the first printed pattern PP1" and the second printed pattern PP2", the first sub-area SA1 and the second sub-area SA2 having relatively small cross-sectional areas may overlap each other. Therefore, it is possible to prevent the cross-sectional area in the overlapping area from becoming dramatically larger than the cross-sectional area in the non-overlapping area (for example, the first central area CA1 and the second central area CA2), or a step from forming between the first printed pattern PP1" and the second printed pattern PP2" on a plane.

According to the embodiments described above, printed patterns may be formed using a corrosion plate including an intaglio pattern in which a cross-sectional area at the end portion is smaller than a cross-section area at the central portion. Therefore, areas having smaller cross-sectional areas (for example, at least one of thickness and width) in adjacently-positioned patterns may overlap each other. By overlapping the areas with small cross sections, it is possible to prevent the cross-sectional area in the overlapping area from being dramatically larger than the cross-sectional area in the non-overlapping area, or a step from forming between adjacent printed patterns on a plane. Therefore, when manufacturing a window using the corrosion plate according to the embodiments of the present disclosure, a window with high reliability can be manufactured.

Effects according to the embodiments are not limited by the above-described contents, and more various other effects are included in the present specification.

Although the present disclosure has been specifically described according to the above-described embodiments, it should be noted that the above-described embodiments are intend to illustrate the present disclosure and not to limit the scope of the present disclosure. Those of ordinary skill in the art to which the present disclosure pertains will understand that various modifications are possible within the scope of the technical spirit of the present disclosure.

Therefore, the technical protection scope of the present disclosure is not limited to the detailed description described in the specification, but should be determined by the append claims. In addition, changes or modifications derived from the meaning and scope of the claims and their equivalents should be construed as being included in the scope of the present disclosure.

What is claimed is:

1. A method of manufacturing a window comprising:

printing a first printed pattern on a base substrate using a corrosion plate including an intaglio pattern having end portions and a central portion between the end portions, wherein at least one end portion has a different cross-sectional area from the central portion, each cross-sectional area being on a plane that is perpendicular to a longitudinal direction; and printing a second printed pattern on the base substrate using the corrosion plate, wherein a portion of the first printed pattern and a portion of the second printed pattern overlap each other, and wherein the first printed pattern and the second printed pattern on the base substrate form the window.

2. The method of claim 1, wherein a portion corresponding to the end portion of the corrosion plate in the first printed pattern and a portion corresponding to the end portion of the corrosion plate in the second printed pattern are printed to overlap each other at least partially.

3. The method of claim 2, wherein the printing of the first printed pattern includes:

depositing printing ink in the corrosion plate;

transferring the printing ink from the corrosion plate to a pad; and printing the first printed pattern on the base substrate by pressing the pad with the printing ink against the base substrate.

4. The method of claim 3, wherein the first printed pattern is formed by transferring the printing ink from the intaglio pattern to the base substrate, the first printed pattern having first sub-areas and a first central area between the first sub-areas, wherein a cross-sectional area of at least one of the first sub-areas corresponding to the end portions of the intaglio pattern is smaller than a cross-sectional area of the first central area corresponding to the central portion of the intaglio pattern.

5. The method of claim 4, wherein the cross-sectional area in the first sub-area decreases with distance from the first central area in the longitudinal direction.

6. The method of claim 5, wherein a thickness in the first sub-area is smaller than a thickness in the first central area.

7. The method of claim 5, wherein a width in the first sub-area is smaller than a width in the first central area.

8. The method of claim 5, wherein the printing the second printed pattern includes:

depositing the printing ink into a groove in the corrosion plate;

transferring the printing ink from the corrosion plate to the pad; and printing the second printed pattern on the base substrate such that the second printed pattern partially overlaps the first printed pattern by pressing the pad with the printing ink against the base substrate.

9. The method of claim 8, further comprising forming the second printed pattern by transferring the printing ink from the intaglio pattern to the base substrate, the second printed pattern having second sub-areas and a second central area between the second sub-areas, wherein a cross-sectional area of at least one of second sub-areas corresponding to the end portions of the intaglio pattern is smaller than a cross-sectional area of the second central area corresponding to the central portion of the intaglio pattern.

10. The method of claim 9, wherein the first sub-area of the first printed pattern and the second sub-area of the second printed pattern overlap each other at least partially.

11. The method of claim 10, wherein the cross-sectional area in the second sub-area decreases with distance from the second central area in the longitudinal direction.

12. The method of claim 11, wherein a thickness in the second sub-area is smaller than a thickness in the second central area.

13. The method of claim 12, wherein a width in the second sub-area is smaller than a width in the second central area.

* * * * *